July 12, 1949.   O. TOLAND   2,475,762
WIRE REEL AND WINCH
Filed March 28, 1946   3 Sheets-Sheet 1

Orlando Toland
INVENTOR.

BY
ATTORNEYS.

July 12, 1949.　　　　　　　O. TOLAND　　　　　　2,475,762
WIRE REEL AND WINCH

Filed March 28, 1946　　　　　　　　　　　　　3 Sheets-Sheet 3

Orlando Toland
INVENTOR.

BY *Knowles*
ATTORNEYS.

Patented July 12, 1949

2,475,762

UNITED STATES PATENT OFFICE 2,475,762

WIRE REEL AND WINCH

Orlando Toland, Industry, Ill.

Application March 28, 1946, Serial No. 657,642

2 Claims. (Cl. 242—93)

This invention relates to a combined reel and winch attachment for use on tractors, the primary object of the invention being to provide a device of this character which may be readily and easily attached to a tractor frame, means being provided for taking off power from the usual tractor power take-off pulley.

Another object of the invention is to provide an attachment of this character having guide rollers between which the cable, wire, or element being wound on the reel may move, thereby insuring a true winding of the flexible element on the reel.

Still another object of the invention is to provide friction means adapted to retard rotary movement of the reel, thereby insuring perfect control of the reel in unwinding or winding a wire, cable, or line.

With the foregoing and other objects in view which will appear as the description proceeds, the invention consists of certain novel details of construction and combination of parts, hereinafter more fully described and pointed out in the claims, it being understood that changes may be made in the construction and arrangement of parts without departing from the spirit of the invention as claimed.

Referring to the drawings.

Figure 1:
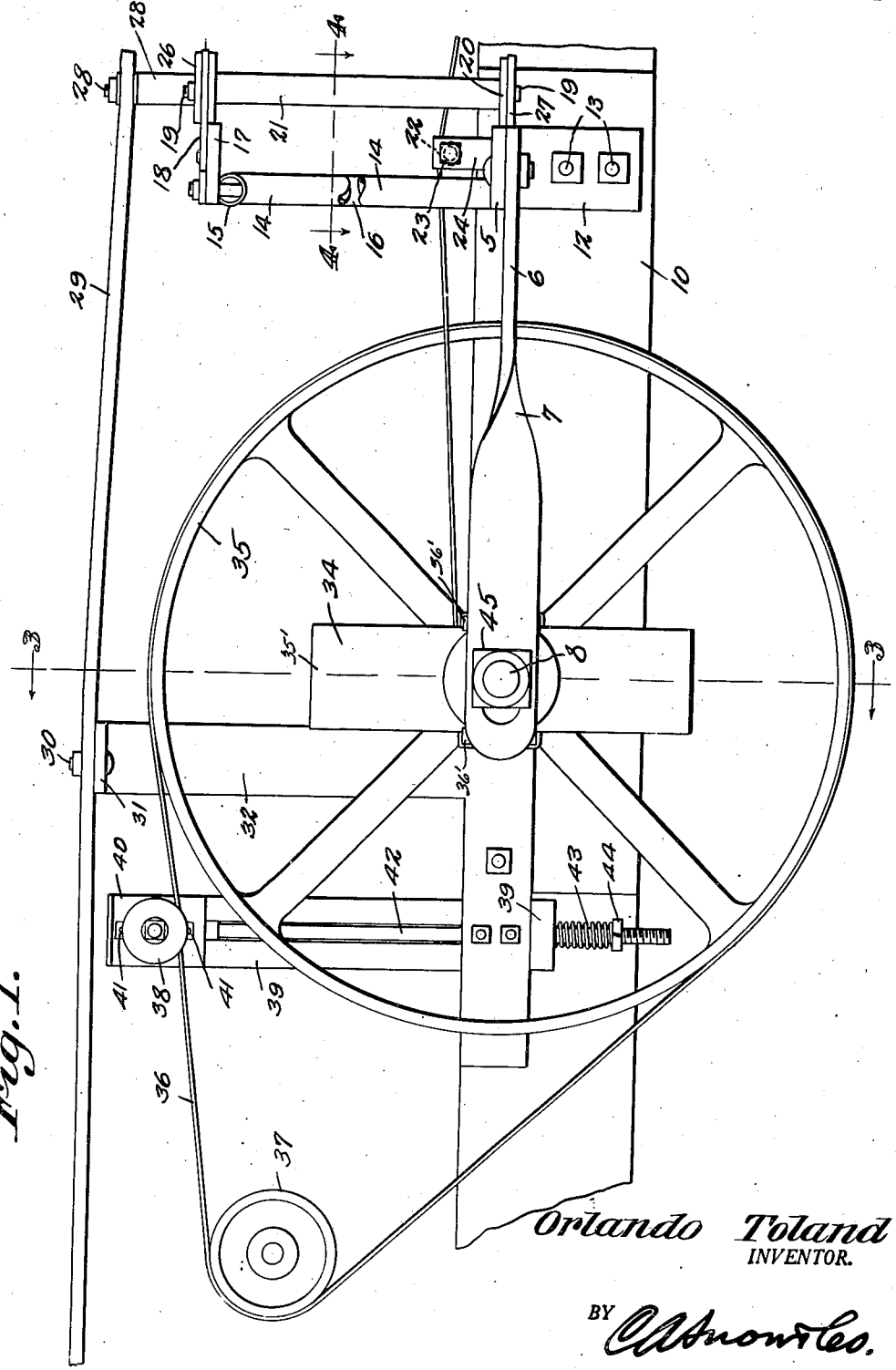
Figure 1 is an elevational view of a device constructed in accordance with the invention.
Figure 2:
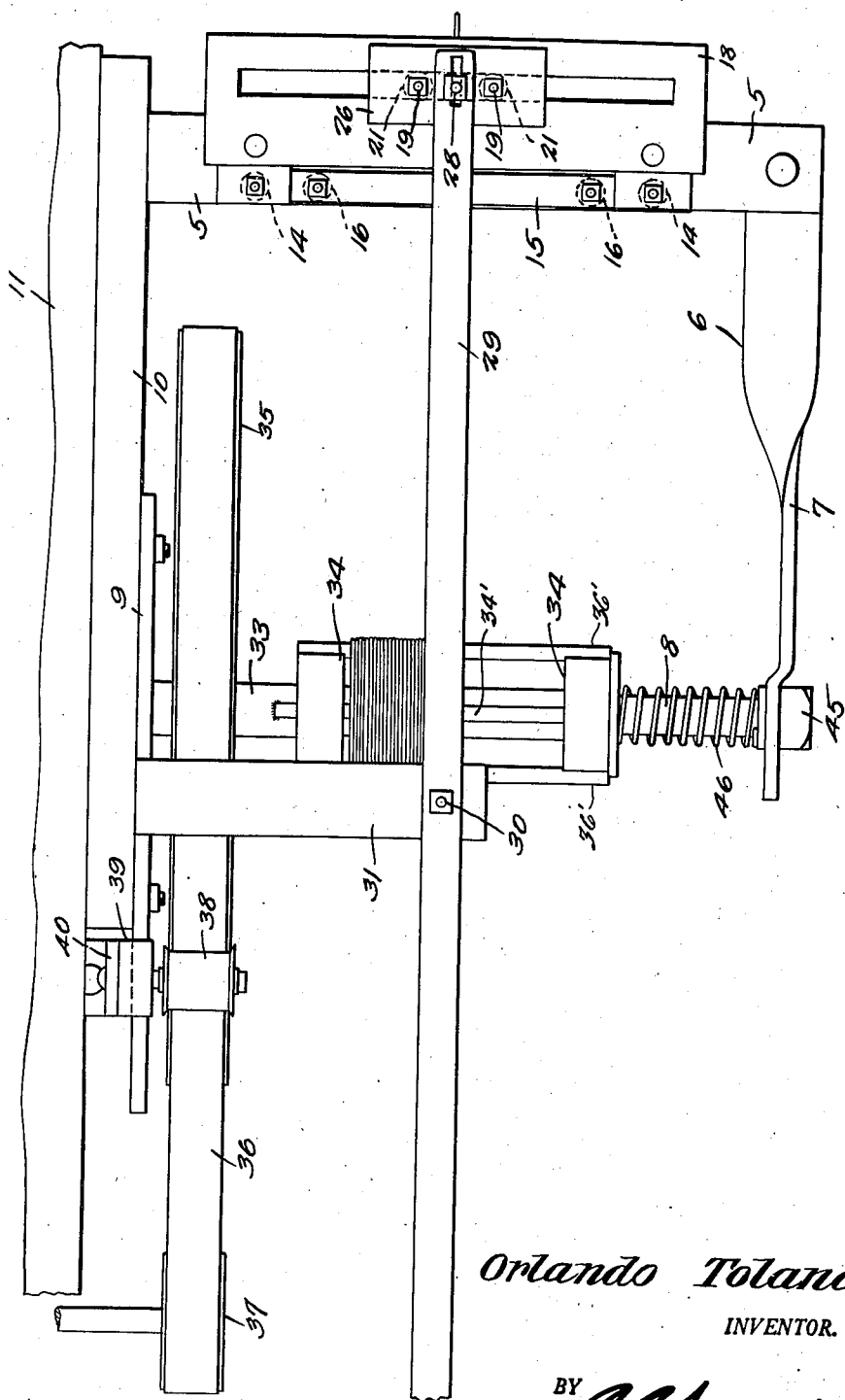
Figure 2 is a plan view thereof.
Figure 3:
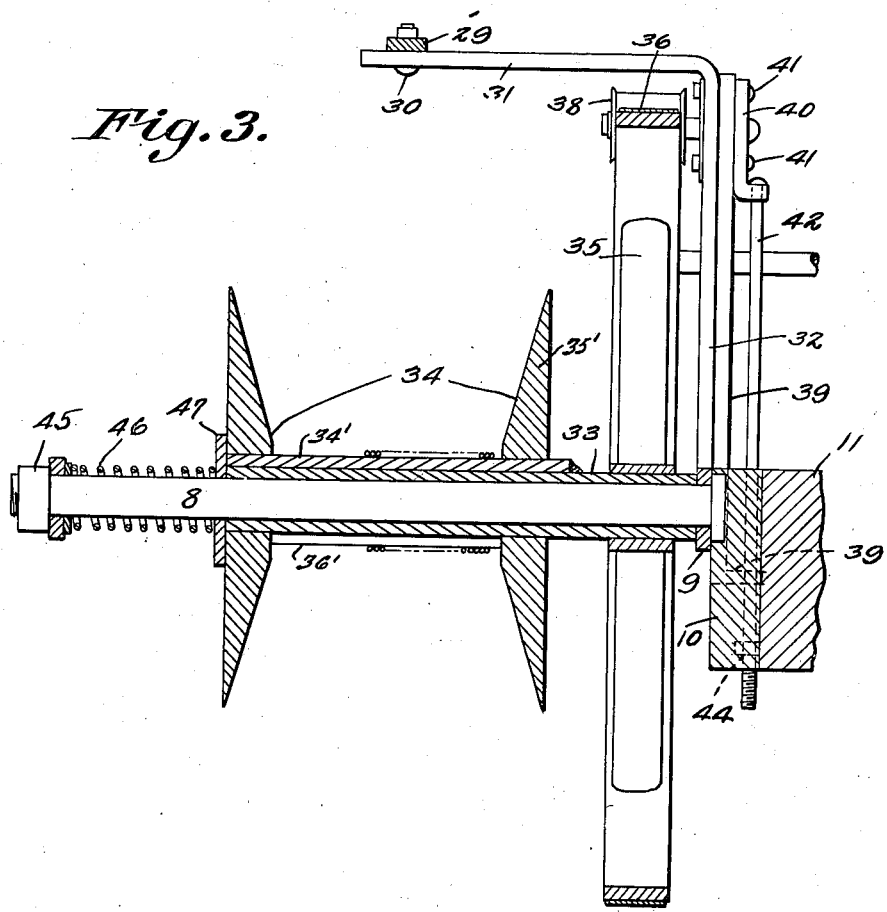
Figure 3 is a sectional view taken on line 3—3 of Figure 1.
Figure 4:
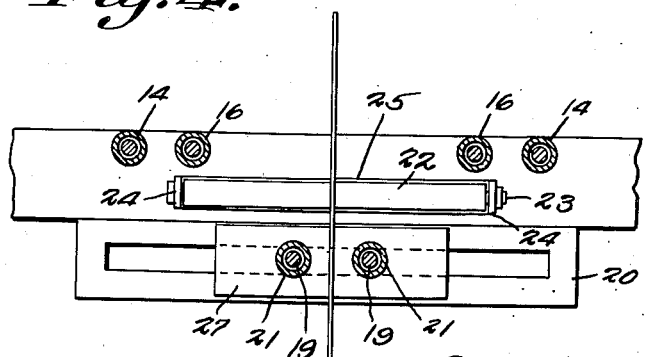
Figure 4 is a sectional view taken on line 4—4 of Figure 1.

Referring to the drawings in detail, the device comprises a frame including the forward bar 5 to which the rearwardly extended bar 6 is securely fastened, the bar 6 being twisted at 7 so that the side faces of the bar are vertically disposed for a distance of substantially one-half the length of the bar. This bar 6 is formed with an opening in which the shaft 8 is secured, the opposite end of the shaft 8 being held within an opening of the bar 9 that is formed with bolt openings to receive bolts, whereby the bar 9 may be bolted to a tractor frame. A wide bar 10 is disposed between the bar 9 and bar 11 of the tractor frame to properly space the frame of the attachment from the tractor frame.

The inner end of the bar 5 extends downwardly as at 12 where it is formed with openings to receive the bolts 13, whereby the bar 5 may be secured to the tractor frame.

Secured to the bar 5 and extending vertically therefrom, are rigid tubes 14 that have their upper ends connected by means of the horizontal tube 15, the horizontal tube 15 providing a support for the vertical rollers 16 that are arranged in spaced relation with the rigid tube 14, the vertical rollers 16 providing guides for the cable and line being wound on the reel or winch of the machine.

Plates 17 extend from the tube 15 and provide a support for the guide plate 18 which is formed with an elongated opening through which the upper ends of the shafts 19 extend, the shafts 19 having their lower ends disposed within the elongated opening of the plate 20 in such a way that the shafts 19 may move transversely of the frame of the machine. Rollers 21 are mounted on the shafts 19, the space between the rollers 21 providing a guide between which the line or cable being wound or unwound, moves. Associated with the rollers 21, is a roller 22 that is mounted on the shaft 23 that is mounted in the upturned ends 24 of the bar 25, the bar 25 being bolted to the forward bar 5, at a point directly in front of the vertical rollers 16. This roller 22 provides a support for the cable or line being wound or unwound, to reduce friction.

As shown, the shafts 19 extend through the plates 26 and 27 at the upper and lower ends thereof, whereby the shafts are held in true vertical positions at all times.

Rising from the upper plate 26 and being secured thereto is a post 28' having a bolt 28 extending upwardly therefrom to which the lever 29 is connected, the lever 29 being pivotally mounted on the frame of the machine, by means of the bolt 30 that extends upwardly from the outwardly extended end 31 of the bar 32. This lever 29 is of a length to extend to a point adjacent to the driver's seat so that the driver of the tractor will have easy access thereto and may, by swinging the lever 29 laterally, move the guide rollers transversely of the frame of the machine in guiding the cable or line so that it will be evenly wrapped on the reel or winch.

The wire reel is of the usual and well known structure on which rolls of wire are sold, the reel ends 35' having notches so that the reel may be slipped over the key 34' securing the reel to the bearing 33, the key being secured by welding. The ends 35' of the reel are connected by the bars 36' over which the wire is wound.

Mounted on the shaft 8 is a tubular bearing 33 to which the reel 34 is secured, the inner end of the tubular bearing 33 being secured within the hub of the pulley 35 over which the belt 36 operates, the belt 36 also operating over the power take-off pulley 37 of the tractor. An idle pulley 38 is mounted on the support 39 which is in the form of a bar rising from the bar 9, the support having an elongated opening in which the shaft of the idle pulley 38 moves. The inner end of the shaft of the idle pulley extends into the plate 40 that is provided with bolts 41 also movable through the elongated opening of the support, to secure the plate 40 in its vertical adjusted positions. The lower end of the plate 40 extends laterally where it is provided with an opening in which the adjusting bolt 42 is disposed, the lower end of the bolt 42 extending through the lower right-angled end of the support 39.

A coiled spring 43 is compressed between the lower right-angled end of the support 39 and the nut 44 threaded on the lower end of the bolt 42, whereby the idle pulley may be moved to various positions to tighten the belt 36.

Mounted on the outer end of the shaft 8, is a nut 45 that holds the shaft in position. Disposed between the outer end of the reel 34 and frame of the attachment, is a coiled spring 46 which acts to normally exert pressure against the disk 47 that rests against the outer end of the reel 34. This spring acts as a means to retard movement of the reel 34 and insure against the reel over-running when a line or cable is being unwound therefrom.

From the foregoing it will be seen that due to the construction shown and described, I have provided a reel or winch on which cables, lines, or wire fencing material may be wound or unwound, the operation of the reel being controlled by the operator of the tractor on which the attachment is secured.

By moving the lever 29, the line, cable or wire material may be evenly distributed over the reel for the proper winding of the material on the reel.

In view of the foregoing detailed disclosure, a further disclosure as to the operation of the attachment is believed unnecessary.

What is claimed is:

1. A wire reeling device for attachment to a tractor having a power take-off, comprising a frame, a reel mounted on the frame, a horizontal elongated roller mounted on the frame, on which a wire being wound on the reel is supported, an auxiliary movable frame slidable transversely of the frame adjacent to the reel, spaced vertical rollers disposed adjacent to the horizontal elongated roller mounted on the movable frame, between which the wire being reeled moves, means for sliding the movable frame and vertical rollers laterally, evenly feeding the wire to the reel, and means for transmitting rotary movement of the power take-off to the reel.

2. A wire reeling device for attachment to a tractor having a power take-off, comprising a frame, a horizontal shaft on the frame, a reel mounted on the shaft, an elongated horizontally disposed roller mounted on the frame, over which a wire being wound on the reel moves, stationary horizontal upper and lower plates mounted on the frame, said plates having elongated openings, a movable auxiliary frame including upper and lower plates slidably mounted on said stationary horizontal plates, vertical shafts connecting the slidable plates, spaced vertical guide rollers secured on the shafts between which a wire being reeled moves, said shafts moving in the elongated openings of said stationary plates slidably mounting the auxiliary frame on said stationary plates, whereby said auxiliary frame and vertical rollers may move laterally with respect to the path of travel of the wire while being rolled, and a manually operated lever connected with the auxiliary frame whereby said auxiliary frame is moved laterally guiding the wire evenly on the reel, and means for transmitting movement of the power take-off to the reel.

ORLANDO TOLAND.

REFERENCES CITED

The following references are of record in the file of this patent:

UNITED STATES PATENTS

| Number | Name | Date |
|---|---|---|
| 414,809 | Grove | Nov. 12, 1889 |
| 657,474 | Waterman | Sept. 4, 1900 |
| 817,248 | Jacox | Apr. 10, 1906 |
| 1,813,831 | Wessler | July 7, 1931 |
| 1,823,212 | Saunders | Sept. 15, 1931 |